United States Patent
Ivtsenkov et al.

(10) Patent No.: US 6,539,132 B2
(45) Date of Patent: Mar. 25, 2003

(54) ACOUSTO-OPTICAL SWITCH FOR FIBER OPTIC LINES

(76) Inventors: Gennadii Ivtsenkov, 386 Rexford Dr., Hamilton, Ontario (CA), L8W 2M6; Valeri Narver, Marshal Gukov Prospect, 30, block 2, app, 866, Saint-Petersburg (RU); Leonid Magdich, Litovski Blvd. 15, block 1, app, 118, Moscow (RU); Nikolay Solodovnikov, 25th January Str. 70, app, 32, Voronezg, 394 063 (RU)

( * ) Notice: Subject to any disclaimer, the term of this patent is extended or adjusted under 35 U.S.C. 154(b) by 0 days.

(21) Appl. No.: 09/790,924

(22) Filed: Feb. 22, 2001

(65) Prior Publication Data

US 2002/0054725 A1 May 9, 2002

Related U.S. Application Data

(60) Provisional application No. 60/183,798, filed on Feb. 22, 2000.

(51) Int. Cl.[7] .............................................. G02F 1/335
(52) U.S. Cl. ............................. 385/7; 385/16; 385/22
(58) Field of Search ................................. 385/7, 16–24, 385/14, 15

(56) References Cited

U.S. PATENT DOCUMENTS

| | | | |
|---|---|---|---|
| 3,883,220 A | 5/1975 | Taylor | 350/96 |
| 4,365,862 A | 12/1982 | Terui et al. | 350/96.13 |
| 4,491,384 A * | 1/1985 | Yamashita et al. | 385/16 |
| 4,514,046 A | 4/1985 | Carlsen et al. | 350/385 |
| 4,585,301 A | 4/1986 | Bialkowski | 350/96.2 |
| 4,679,901 A | 7/1987 | Dammann et al. | 350/162.2 |
| 4,759,595 A | 7/1988 | Boord et al. | 350/96.13 |
| 4,813,757 A | 3/1989 | Sakano et al. | 350/96.14 |
| 4,818,050 A | 4/1989 | Duthie | 350/96.14 |
| 4,834,488 A | 5/1989 | Lee | 350/96.2 |
| 4,886,335 A | 12/1989 | Yanagawa et al. | 350/96.2 |
| 4,946,233 A | 8/1990 | Seto | 350/6.5 |
| 4,952,010 A | 8/1990 | Healey et al. | 350/3.77 |
| 5,016,957 A | 5/1991 | Seaver | 350/96.13 |
| 5,080,504 A | 1/1992 | Partain et al. | 385/17 |
| 5,090,824 A | 2/1992 | Nelson | 385/22 |
| 5,202,786 A | 4/1993 | Boyle et al. | 359/243 |
| 5,303,315 A | 4/1994 | Granestrand | 385/16 |
| 5,305,136 A | 4/1994 | Smith | 359/247 |
| 5,400,428 A | 3/1995 | Grace | 385/115 |
| 5,408,548 A | 4/1995 | Olmstead | 385/16 |
| 5,452,383 A | 9/1995 | Takiguchi | 385/16 |
| 5,581,643 A | 12/1996 | Wu | 385/17 |
| 5,594,818 A | 1/1997 | Murphy | 385/8 |
| 5,621,829 A * | 4/1997 | Ford | 385/22 |
| 5,647,039 A | 7/1997 | Judkins et al. | 385/37 |
| 5,757,990 A * | 5/1998 | Miyakawa | 385/16 |
| 5,841,556 A | 11/1998 | Hong et al. | 359/117 |
| 5,841,912 A | 11/1998 | Mueller-Fiedler et al. | 385/7 |
| 5,892,862 A | 4/1999 | Kidder et al. | 385/16 |
| 6,411,748 B1 * | 6/2002 | Foltzer | 385/7 |

FOREIGN PATENT DOCUMENTS

EP 0 488 903 B1 5/1996

* cited by examiner

Primary Examiner—Phan T. H. Palmer
(74) Attorney, Agent, or Firm—Kinney & Lange, P.A.

(57) ABSTRACT

An optical switch for coupling a trunk optic fiber to a selected branch optic fiber is disclosed. The switch includes one or two optically active elements which are capable of being configured to have a different diffraction angle. The elements are configured so that an optical signal emitted from the trunk fiber is directed into the selected branch fiber. The switch may also operate in reverse to couple a signal from the branch fiber into the trunk fiber.

56 Claims, 6 Drawing Sheets

ACOUSTO-OPTICAL SWITCH FOR FIBER OPTIC LINES

The benefit of the filing date of Feb. 22, 2000 of Provisional Application Ser. No. 60/183,798 is hereby claimed.

FIELD OF THE INVENTION

This invention relates to switches for fiber optic lines. More particularly, it relates to an optical switch for coupling a single fiber optic line to a plurality of fiber optic lines or for coupling a plurality of fiber optic lines to a single fiber optic line.

BACKGROUND OF THE INVENTION

Increasingly, fiber optic communication lines are used in place of, or in conjunction with, electrical communication systems. Fiber optic lines are advantageously unaffected by ambient electromagnetic fields, can provide faster communication lines and can carry a broader bandwidth than electrical lines.

Fiber optic cables are often organized in bundles which include a large number of individual optic fibers, each of which may be coupled to a separate device. In order for each device to communicate with a remote device that is accessible only through a single optic trunk fiber, it is necessary to provide an optical switch which couples the device's specific optic fiber with the the trunk fiber. It is desirable that such an optical switch be capable of switching rapidly so that different devices may be sequentially connected to the trunk fiber with minimal switching delays.

U.S. Pat. No. 5,757,990 describes an optical switch that allows an input optical signal to be switched between two optical outputs. The switch includes an optically active substrate which is responsive to electrical signals to control its refractive index. When an electric signal is applied in a positive direction, the refractive index of the substrate is altered to direct the input optical signal to one of the optic outputs. When the electric signal is applied in a negative direction, the refractive index is inversely altered to direct the input optical signal to the other output. Such an optical switch may be constructed to have a switching time on the order of 10 $\mu$S, and possibly even less. However, this device provides only two optical outputs, and therefore is not suitable use in connecting a trunk optic fiber with a large number of local optic fibers.

U.S. Pat. No. 4,491,384 discloses an optical switch that can switch an input optical signal between a number of optic outputs. The device has a piezoelectric substrate with a waveguide layer. A pair of interdigital transducers (IDTs) are formed on the waveguide layer. Each of the IDTs can selectively produce surface acoustic waves (SAWs) on the piezoelectric substrate. An input optical signal received by the waveguide layer may be refracted by one or both of the surface acoustic waves, allowing the input optical signal to be directed to one of three optical outputs. By adding additional IDTs, the number of optical outputs may be increased. However, because this device uses a thin surface layer to deflect the input optical signal, it cannot practically be used to couple the optical input signal with a large number optic outputs. Furthermore, the efficiency of this device is limited, particularly where a large number of IDTs is used to provide additional optical outputs, since this will, in general, increase the number of times the input optical signal must be deflected to reach some of the optical outputs.

U.S. Pat. No. 5,621,829 to Ford discloses a device and method for selectively connecting an input optic fiber in a fiber bundles to at a selected output optic fiber in a fiber bundle. The device includes a collimator which directs an optical signal from the input fiber onto a scan mechanism. The scan mechanism reflects the optical signal back through the collimator onto the output fiber. The scan mechanism described comprises a mirror that may be moved by a mechanical system to reflect the optical signal into the output fiber. The scan mechanism and collimator together act as an optical switch. Although this switching device can couple the input fiber to a large number of output fibers in the fiber bundle, the device has a relatively long switching delay. The delay is required to reposition the mirror when the optical signal is to be reflected onto a different output fiber in the fiber bundle. Typically, these devices have a switching time on the order of 1 millisecond or more. Although the patent states that the scan mechanism may also be a liquid crystal or electro-optical device, no explanation is given as to how these devices might be implemented.

Accordingly, there is a need for an optical switch which can be used to couple a first optic fiber with a second optic fiber selected from a fiber bundle and which can switch between different fibers in the fiber bundle with a relatively short propogation delay. It is preferable if the optical switch is operative in both directions to allow signals emitted from either the first or second optic fiber to be received by other optic fiber. Further, it is preferable if the switch has a relatively high efficiency so that a large proportion of light incident on the switch is transmitted by the switch.

SUMMARY OF THE INVENTION

This invention provides an acousto-optical switch for coupling a first optic fiber to a second optic fiber. The second optic fiber may be one of many optic fibers in a fiber bundle. The switch includes a controller which generates two frequency modulated electrical control signals. Each control signal is received by a piezoelectric transducer which generates a three dimensional acoustic wave in a corresponding optically active element coupled to the piezoelectric transducer, thereby changing the diffraction angle of the optically active element. The piezoelectric transducers and optically active elements are arranged so that their respective diffraction angles are generally at right angles to one another. An optical signal emitted by the first optic fiber is passes through the optically active elements in turn and is deflected in two dimensions. The frequencies of the acoustic waves are selected such that the optical signal is deflected into the second optic fiber.

In a first aspect, the present invention provides an optical switching apparatus for coupling a first optic fiber with a second optic fiber, said switch comprising: a controller for producing a first electric signal and a second electric signal; first and second optically active elements, each of said optically active elements having a diffraction angle; first and second piezoelectric transducers coupled to said controller for receiving said first and second electric signals, said first piezoelectric transducer being coupled to said first optically active element and being responsive to said first electric signal to produce a first acoustic wave in said first optically active element, said second piezoelectric transducer being coupled to said second optically active element and being responsive to said second electric signal to produce a second acoustic wave in said second optically active element, wherein the diffraction angle of said first optically active element corresponds to said first acoustic wave, and wherein the diffraction angle of said second optically active element corresponds to said second acoustic wave, and wherein an optical signal emitted from said first optic fiber is deflected by said first and second optically active elements into said second optic fiber.

In a second aspect, the present invention provides an optical switch for coupling a first optic fiber with a second optic fiber, said switch comprising: a controller for producing an electric signal; a piezoelectric transducer for receiving said electric signal and providing an acoustic signal corresponding to said electric signal; an optically active element responsive to said acoustic signal for controlling the diffraction angle of said optically active element, wherein said controller generates a signal to control the diffraction angle of said optically active element such that an optical signal emitted from said first fiber passes through said optically active element and is deflected into said second optic fiber.

In a third aspect, the present invention provides a method for directing an optical signal emitted from a first optic fiber into a second optic fiber, said method comprising the steps of: selecting said second optic fiber from a plurality of optic fibers; deflecting said optical signal along a first plane; deflecting said optical signal along a second plane generally perpendicular to said first plane; and focusing said optical signal such that it is aligned with said second fiber.

BRIEF DESCRIPTION OF THE DRAWINGS

An exemplary embodiment of the present invention will now be explained with reference to the drawings, in which.

DETAILED DESCRIPTION OF THE PREFERRED EMBODIMENT

Figure 1:
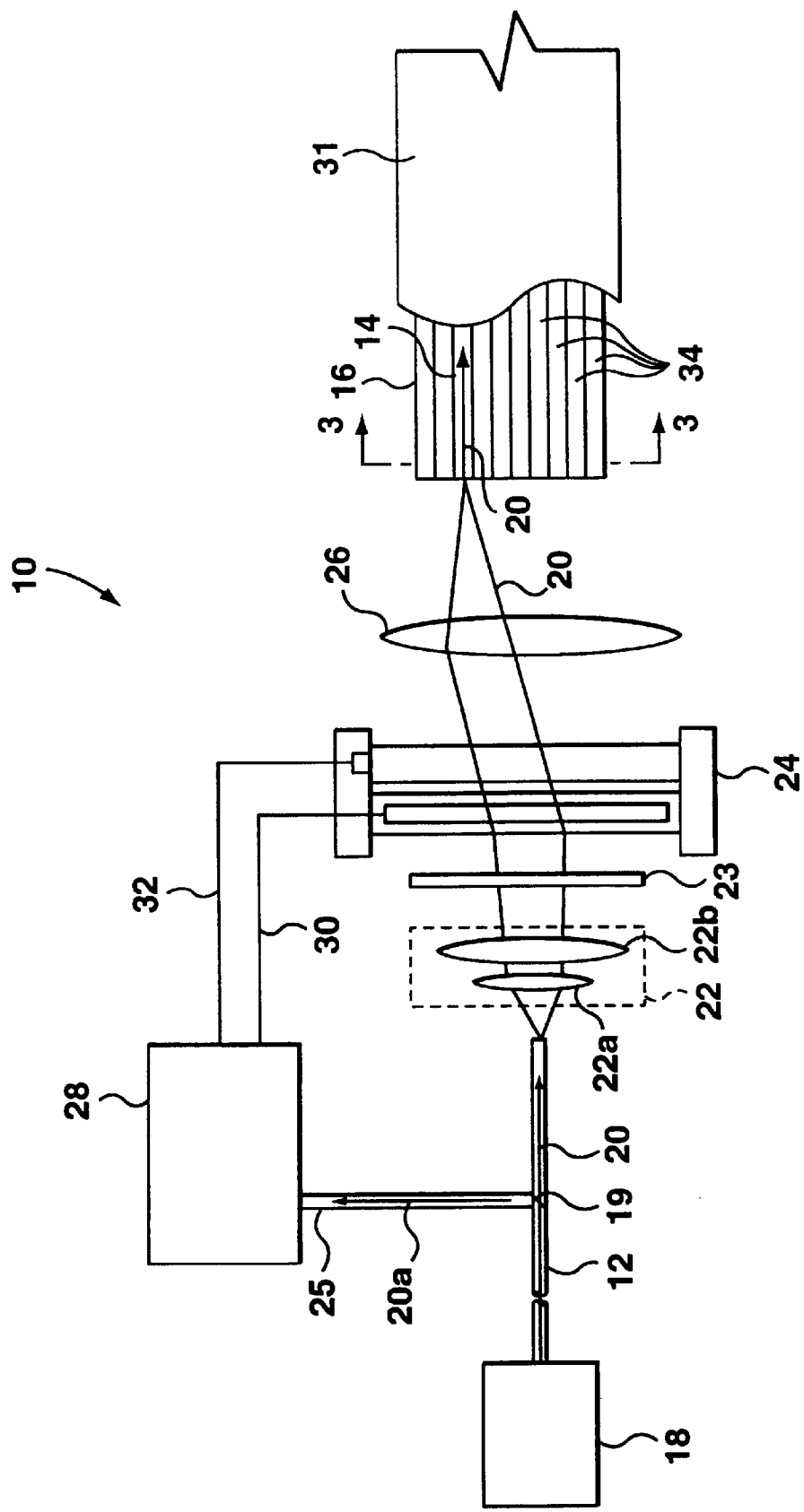
FIG. 1 is a schematic view of a system incorporating an optical switch according to the present invention.

Reference is first made to FIG. 1, which illustrates a system 10 for selectively coupling an optic fiber 12 to one optic fiber 14 in fiber bundle 16. Fiber bundle 16 consists of a number of optic fibers 34, including fiber 14. Optic fiber 12 may be referred to as a trunk fiber and optic fibers 34 may be referred to as branch fibers, depending on the construction and usage of system 10.

In system 10, fibers 34 are arranged systematically in an array. Alternatively, fibers 34 may be bundled together randomly within fiber bundle 16. Fiber bundle 16 is mounted in a frame 31 (shown partially cut away in FIG. 1). Typically, frame 31 will extend close to the ends of fibers 34 to maintain their arrangement.

A signal source 18 produces an optical signal 20 and transmits signal 20 on fiber 12. Signal source 18 may be a telecommunications receiver that receives one or more electromagnetic signal and converts (and combines) them into optical signal 20. Fiber 12 emits signal 20 onto a lens assembly 22 that projects optical signal 20 through polarization rotating element 23 onto optical switch 24.

Lens assembly 22 may be a compound element device, comprising two optical elements 22a and 22b, as shown in FIG. 1. Alternatively, lens assembly 22 may be have more than two elements or may have a single element. Typically, light emitted by an optic fiber, such as optic fiber 12 is highly divergent. As optical signal 20 is emitted from optic fiber 12, it passes through lens assembly 22, which renders optical signal 20 a slightly divergent beam and directs it onto optical switch 24. Optic fibers which emit a coherent output signal with low divergence are available. If optic fiber 12 is such a fiber, lens assembly 22 may be omitted.

Typically, fiber 12 will be a single-mode optical fiber. Such fibers normally rotate the plane of polarization of the optical signal 20 transmitted through them randomly. Polarization-rotating element 23 is preferably configured to rotate the plane of polarization of signal 20 when it is emitted by fiber 12 so that signal 20 is incident on lens 26, after passing through switch 24 as described below, at its maximum intensity. Typically, polarization-rotating element 23 is mounted such that it may be rotated manually or automatically under the control of an actuator (not shown). Optic fibers that do not change the direction of polarization of a light signal transmitted through them are available. If fiber 12 is such a fiber, polarization-rotating element 23 may be omitted.

A splitter 19 is installed in (i.e. spliced into) optic fiber 12. Splitter 19 splits optical signal 20 so that an image signal 20a corresponding to signal 20 is transmitted on optic fiber 25. A controller 28 is coupled to optic fiber to receive image signal 20a. Alternatively, splitter 19 may be positioned between the end of optic fiber 12 and lens assembly 22 and may simply reflect a selected portion of the light energy in light signal 22 into optic fiber 25. This alternative structure may have the advantage of lower cost, since it does not require splitter 19 to be spliced into or otherwise installed in optic fiber 12.

Optical switch 24 deflects optical signal 20 in two dimensions onto lens 26. Lens 26 focuses (or refracts) optical signal 20 into optic fiber 14 (or another optic fiber in bundle 34. The deflection of optical signal 20 by switch 24 is controlled by controller 28 by means of control lines 30, 32. Controller 28 may be configured to control the deflection of optical signal through switch 24 in response to the content of optical signal 20a. When optical signal 20a (which is identical in its content to optical signal 20, in the present exemplary embodiment) indicates that fiber 12 should be coupled to fiber 14 so that signal 20 will be transmitted along fiber 14, controller 28 will configure switch 24 to provide this result. The operation of controller 28 and switch 24 is described further below.

Figure 2:
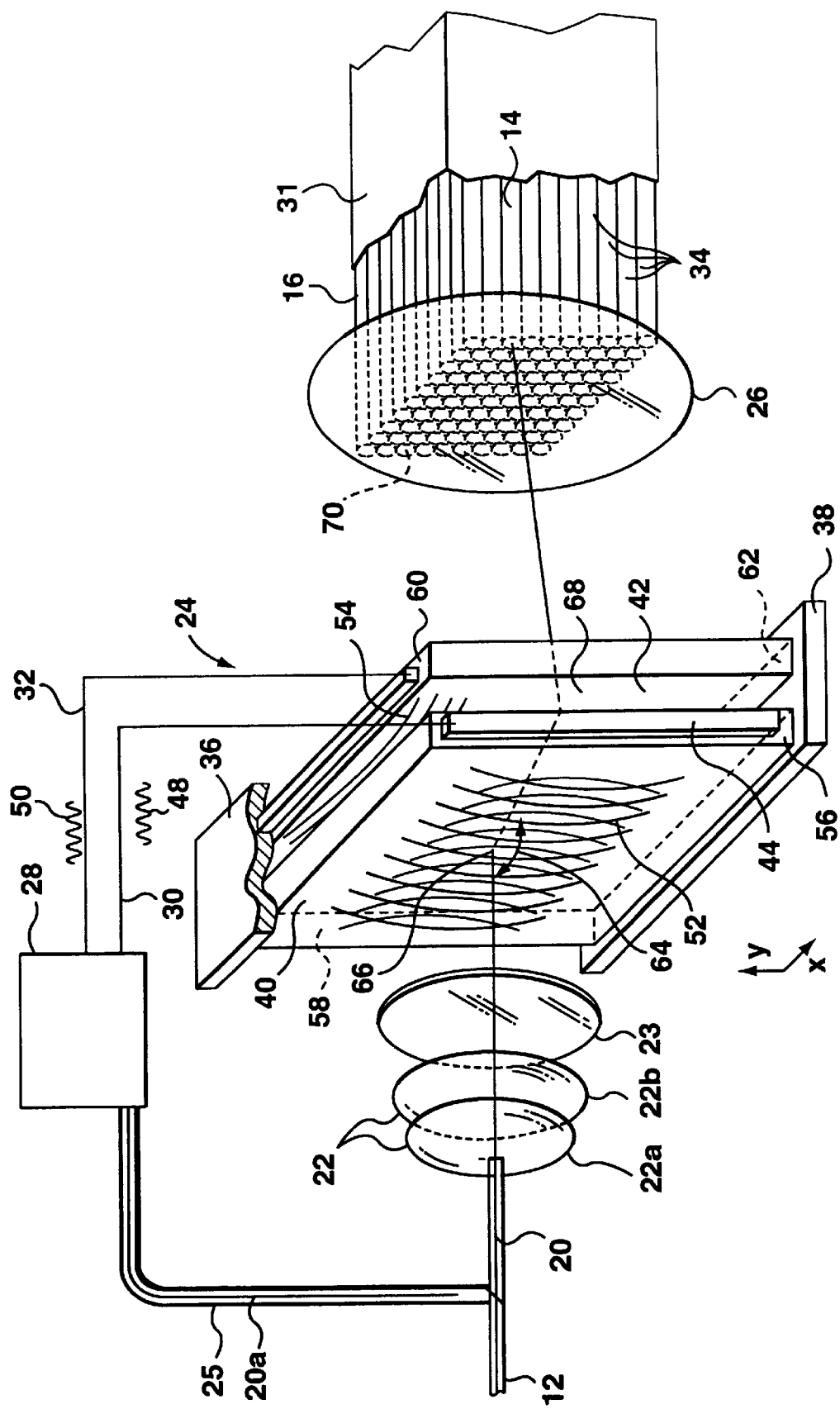
FIG. 2 is a perspective view of the system of FIG. 1.

Reference is next made to FIG. 2, which shows optical switch 24 in greater detail. Optical switch 24 includes a pair of frame members 36 (shown partially cut away) and 38, a pair of optically active crystals 40, 42 and a pair of piezoelectric crystals 44, 46. In FIG. 2, optical signal 22 is represented as a line for clarity and convenience. In the present exemplary embodiment of the present invention, optical signal 22 will typically have diameter of several millimeters. Optical signal 22 may be tightly collimated or it may be slightly convergent or slightly divergent prior to striking switch 24.

In optical switch 24, crystals 40, 42 are square. Frame members 36 and 38 hold crystals 40,42 with their respective faces and sides parallel to one another. Optical signal 20 passes through crystals 40, 42 sequentially. Piezoelectric crystal 44 is coupled to one side 56 of crystal 40. Piezoelectric crystal 46 is coupled to a side 60 of crystal 42 which is at right angles to side 56 of crystal 40. Side surface 58 of crystal 44 opposing side 56 is mirrored. Similarly, side 62 of crystal 44 opposing side surface 60 is mirrored. Controller 28 is coupled to piezo-electric crystals 44, 46 through control lines 30, 32.

Switch 24 operates as follows. Controller 28 produces a frequency modulated control signal 48 on control line 30. Piezo-electric crystal 44 receives signal 48 and produces a corresponding acoustic wave 52 in crystal 40. Acoustic wave 52 travels through crystal 40 from side 56 to mirrored side 58, which reflects acoustic wave 52 back towards side 56, thereby producing a standing acoustic wave in crystal 40. Optically active crystal 40 is responsive to acoustic wave 52 in that the diffraction angle of crystal 40 varies depending on the frequency of acoustic wave 52. In this way, crystal 40 is made into a Bragg diffraction grating with a controllable diffraction angle. Crystal 42 is made into a Bragg diffraction grating in an identical manner under the control of controller 28, through control line 32, which carries a frequency modulated control signal 50. Because piezo-electric crystals 44, 46 are mounted on crystal 40, 42 are right angles, the diffraction angles of the two crystals, when operated as described here, will be at right angles.

Optical signal 20 is incident on crystal 44 at an acute angle 64 which is slightly less than 90°, as is required for Bragg diffraction to occur. Typically, angle 64 will be between 87° and 90°, although angle 64 may be less than 87°. Typically, optical signal 20 will strike an area 66 approximately 2–3 mm in diameter near the centre of crystal 40. In the present example, where optic fiber 12 is shown as being coupled to optic fiber 14, controller 28 generates control signals 48, 50 having a frequency such that optical signal 20 is directed into fiber 14 by lens assembly 22.

As optical signal 20 passes through crystal 40, it is deflected by an angle corresponding to the diffraction angle of crystal 40 in the X direction, as defined on FIG. 2. The deflected signal 20 is then incident on crystal 42 at area 68 and is deflected in the Y direction by an angle corresponding to the diffraction angle of crystal 42. Signal 20 thus emerges from switch 24 having been deflected in both the X and Y directions and is then incident on lens 26. Lens 26 focuses (or refracts) signal 20 into optic fiber 14.

The angles of deflection in the X and Y directions of signal 20 as it passes through crystals 40, 42 are controlled by controller 28 to ensure that signal 20 is directed into optic fiber 14. In this way, optic fiber 12 is coupled with optic fiber 14. If it is desired to couple optic fiber 12 with a different optic fiber 34 in fiber bundle 16, the frequencies of acoustic waves 52, 54 must be changed to vary the deflection angle of crystals 40, 42. As noted above, the content of signal 20a may indicate to controller 28 the specific optic fiber 34 in fiber bundle 16 that signal 20, or a portion of signal 20, should be coupled into.

The switching speed of switch 24 is a function of the size of crystals 40, 42 and the speed of acoustic waves 52, 54 in crystals 40, 42. In this exemplary embodiment of system 10, each of crystals 40, 42 is a tellurium dioxide (TeO$_2$) crystal with a height of 5 mm, a width of 5 mm and a thickness of 2 mm. In another embodiment of present invention, crystals 40, 42 may be larger or smaller to ensure that signal 20 can be sufficiently diffracted.

Acoustic waves 52, 54 typically have a frequency between 50 MHz and 200 MHz and travel through crystals 40, 42 at approximately 1000 m/s. Acoustic waves 52, 54 therefore travel through crystals 40, 42 in approximately 5 μs. In switch 24, a standing wave is established in crystals 40, 42 by reflecting acoustic waves 52, 54 back through crystals 40, 42, which requires an additional 5 μs. The time required for control signals 48, 50 to travel through control lines 30, 32 and for piezoelectric crystals 44, 46 to generate acoustic waves 52, 54 is relatively negligible in comparison to 10 μs. As a result, the switching delay of switch 24 is approximately 10 μs. This switching time is constant, regardless of the relative positions of the optic fiber 34 in fiber bundle 16 to which optical signal 20 was previously coupled and the optic fiber 34 to which optical signal 20 will next be coupled. In contrast, the switching times for mechanical devices such as that disclosed in U.S. Pat. No. 5,621,829 will be lower for adjacent fibers in a fiber bundle and greater for fibers which are relatively distant.

The communication protocol used in conjunction with system 10 must account for the 10 μs switching delay. For example, the protocol may simply specify that the 10 μs portion of optical signal 20 corresponding to the period during which the diffraction angles of switch 24 are changed will be ignored, and therefore should not contain any information. Alternatively, an optical or electronic buffering system may be used to store all or part of the information transmitted in optical signal 20 during the 10 μs switching delay. This information may be then be reinserted into optical signal 20 after the switching delay is over.

Although tellurium dioxide crystals 40, 42 are used in switch 24 due to their high efficiency in acousto-optical devices, a different material (including amorphous materials such as glass) may be used.

As stated above, acoustic waves 52, 54 travel across crystals 40, 42 in opposing directions to set up a standing wave in each crystal. This has the advantage that a 3-dimensional pattern of alternating compressions and depressions is created in crystals 40, 42, forming a Bragg diffraction grating. Such a grating is highly efficient and emits approximately 90% of the light energy incident on it in the first order diffracted output light signal. The remaining 10% of the light energy is emitted in the zero and other order output light signals. The first order output light signal is used in the present invention, providing a high efficiency switch 24 that delivers approximately 80% (i.e. approximately 90%×90%) of the input optical signal emitted from optical fiber 12 to the output fiber 14 when lenses 12 and 26 are selected to have low optical losses.

As stated above, the frequency of control signals 48,50 and acoustic waves 52, 54 in this preferred embodiment of switch 24 ranges between 50 MHz and 200 MHz. This frequency range is selected to provide the desired deflection angles in the X and Y directions to direct optical signal 20 from optic fiber 12 to any one of optic fibers 34. One skilled in the art will be capable of selecting an appropriate frequency range to provide the desired degree of deflection in a different embodiment of the present invention. The power of control signals 48,50 is generally between 0.5–2 W. This voltage range produces acoustic waves 52, 54 in crystals 40, 42 such that the crystals act as high efficiency (i.e. 90%, as discussed above) Bragg diffraction gratings. One skilled in the art will recognize that control signals 48, 50 are relatively high power signals and that controller 28 may require a high power output stage to provide these signals. The power of control signals 48, 50 may be reduced to reduce the power consumption of switch 24, however, this will also reduce the light transmission efficiency of crystals 40, 42.

Although FIG. 2 shows fiber bundle 16 has having a 10 by 10 array of optical fibers 34, the present invention may be used with substantially larger optical fiber bundles. The inventors have implemented the present invention for use with a fiber bundle consisting of a 256×256 array of optical fibers. This implementation is capable of switching from any one of the 65,536 fibers in the bundle to any other fiber in the bundle in approximately 10 µs.

Furthermore, system 10 may be used in reverse to couple any one of optic fibers 34 (i.e. optic fiber 14) to optic fiber 12, without any modification. A signal transmitted on optic fiber 14 will be directed into fiber 12.

System 10 may also be used for duplex communication where optical signals (possibly at different wavelengths) are both transmitted and received by both fibers 12 and 14.

System 10 may also be used in a time division multiplexing system to sequentially couple each optic fiber 34 in fiber bundle 16 to optic fiber 12. For example, optical signal 20 may be divided such that each of the one hundred fibers 34 in fiber bundle 16 is assigned a sequential time slice of 20 µs, including an unusable portion of 10 µs at the beginning of the time slice to allow switch 24 to be configured with the correct deflection angles. In such a system, controller 28 may configure control signal 48 and 50 so that signal 20 is sequentially coupled into each (or some) of the fibers 34 in bundle 16 in a pre-determined order and at the beginning of pre-determined time slices. In this case, controller 28 may monitor signal 20a to determine when each time slice begins.

Alternatively, controller 28 may not monitor signal 20a and may simply provide a control signal to signal source 18 indicating when each time slice begins so that signal source 18 can provide appropriate data for each fiber 34 when required. In another alternative embodiment, signal source 18 may provide an electrical signal to controller 28 to indicate which fiber 34 signal 20 (or a part of signal 20) should be coupled into. In these cases, splitter 19 and fiber 25 are not required.

The present invention provides an optical switch that receives an optical signal from an input optical fiber, deflects it in two dimensions and directs it into an output optical fiber selected from a large number of fibers, which may form a fiber bundle. Although the light deflecting crystals 40, 42 of the preferred embodiment 10 are responsive to an acoustic wave to control their respective diffraction angles, the scope of the present invention includes any switch in which one or more light deflecting elements are used to deflect a light signal emitted from one optic fiber into a second optic fiber. Preferably such a switching element should have a fast switching speed and should also deflect the majority of the light signal into a single order, so as to avoid possible high signal loss or refraction into an unintended optical fiber.

A preferred embodiment of the present invention has been described. Many variations of the invention are possible. Some additional exemplary embodiments are described below.

Figure 3:
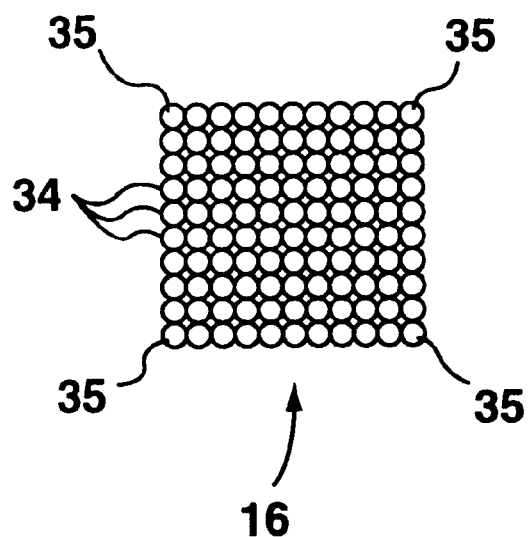
FIG. 3 is a cross-sectional view of a fiber bundle of the system of FIG. 1.
Figure 4:
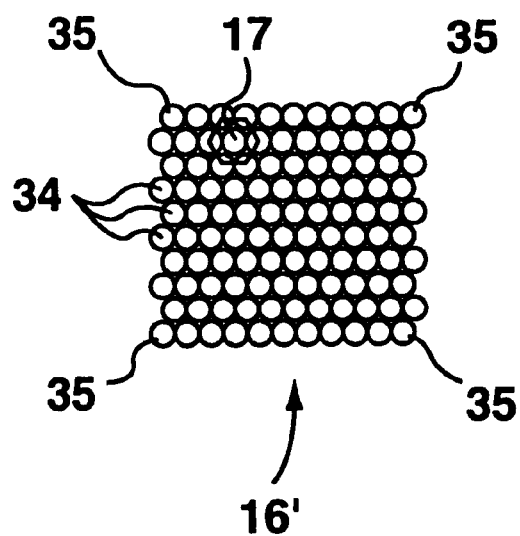
FIG. 4 is a cross-sectional view of an alternative structure for a fiber bundle.

As noted, fibers 34 are preferably arranged in an array in fiber bundle 16. FIG. 3 is a cross sectional view of a portion of the lattice arrangement of fiber bundle 16. Fiber 34 are arranged in a rectangular lattice with regular columns and rows. FIG. 4 illustrates an alternative method of arranging fibers 34 in a fiber bundle 16'. Fiber bundle 16' has a "hexagonal" arrangement in which the fibers 34 in each row are offset from the fibers 34 in the rows above and below by a distance equal to the radius of the fibers 34. The hexagonal structure of fiber bundle 16' is illustrated at fiber 17, which is in contact with 6 fibers, rather than with 4 fibers, as in the case of bundle 16. This arrangement provides a tighter packing of the fibers 34 and allows more fibers 34 to be included in a fiber bundle 16' with the same dimensions as fiber bundle 16.

Referring to FIGS. 1 and 2, fibers 34 are assembled in a bundle 16, which is itself held in frame 31. Frame 31 may include a three dimensional positioning mechanism (not shown) allowing fiber bundle 16 to be positioned precisely in relation to switch 24 and lens 26. The adjustment mechanism may be manually operated or it may be automatically operated by controller 28 through a set of control lines (not shown). One or more optic fibers 34 may be selected as testing or positioning fibers 35 (FIGS. 3 and 4). A splitter (not shown) similar to splitter 19 may be installed in these test fibers 35 and an image of the signal transmitted on the test fibers 35 may be provided to controller 28 using secondary fibers similar to fiber 25. Controller 28 may position fiber bundle 16 by iteratively causing a test signal to be generated and projected onto switch 24 in the place of signal 20, configuring switch 24 to direct the test signal into one or more of the test fibers and then positioning bundle 16 so that the test fibers are positioned correctly for switch 24 to provide a coupling between fiber 12 and any fiber 34. Test fibers 35 are preferably located in each corner of fiber bundle 16 or 16', although this is not required. Once the position of frame 31 has been fixed, the position of each fiber 34 may be calculated relative to the positions of the test fibers 35 and may be recorded by controller 28. As described above, polarization rotating element 23 may be mounted so that it may be rotated by a remotely controlled actuator (not shown). The actuator may be controlled by controller 28 through a control line (not shown) so that the intensity of the test signal received through test fibers 35 is at its maximum.

The embodiment of FIGS. 1 and 2 has a single focusing lens 26. In this case, the optic fiber array 16 preferably contains single-mode fibers 34, where the diameter of cladding on each fiber 34 does not to exceed 30 µm. Such fiber may be prepared from standard 0.125-mm optical fiber by processing in fluorine acid. In another embodiment of the present invention, lens 26 may be a compound multi-lens assembly selected to minimize aberration, particularly when fibers 34 have a cladding larger than 30 µm.

Figure 5:
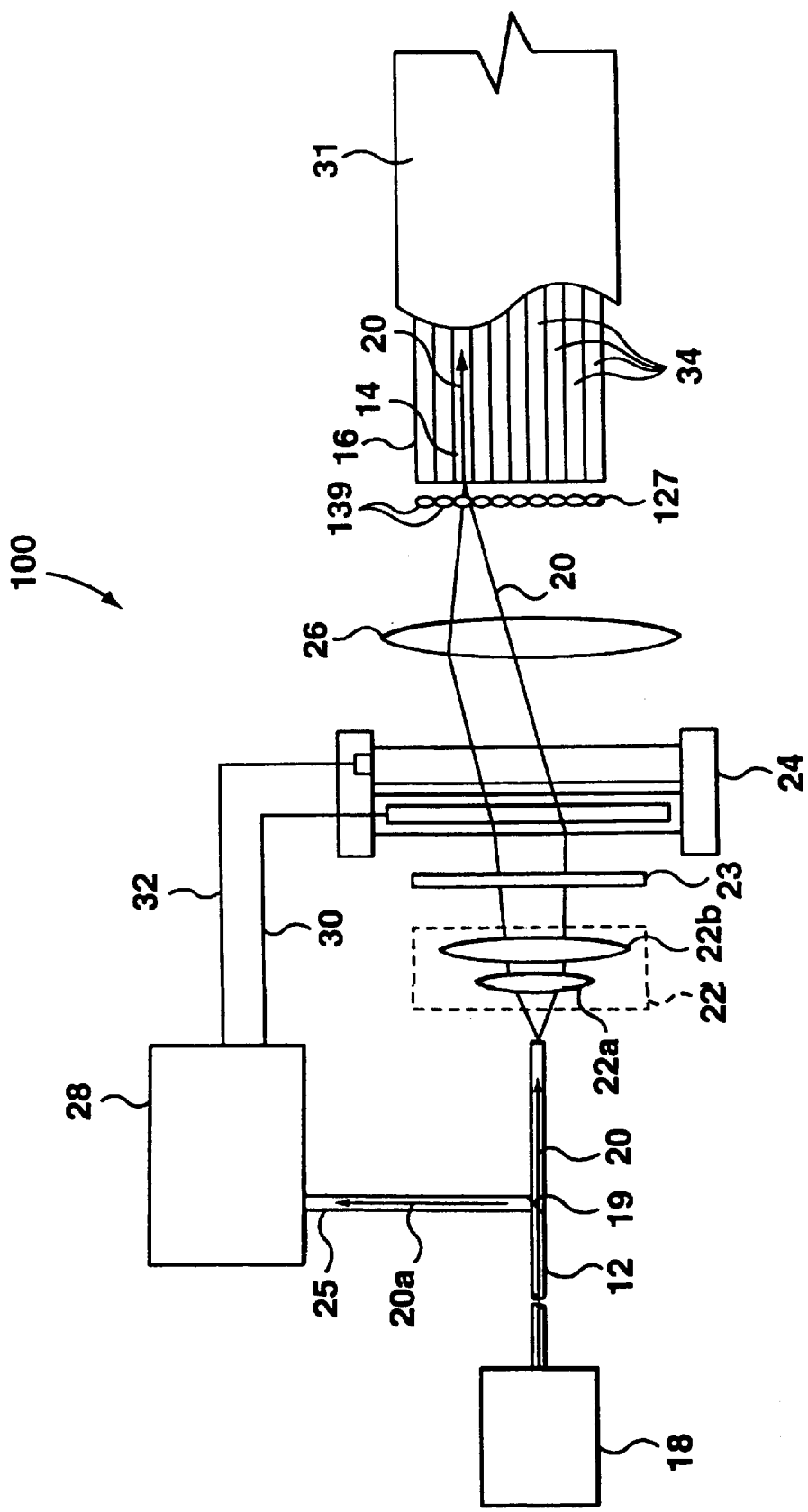
FIG. 5 is a schematic view of a system according to a second embodiment of the present invention.

Reference is made to FIG. 5, which illustrates a system 100 according to a second embodiment of the present invention. In this embodiment, a planar multi-lens array 127 is used in conjunction with lens 26 to focus signal 20 onto fibers 34. Lens array 127 contains a two-dimensional array of micro-lenses 139 (only 1 row of lens array 127 is shown in FIG. 5). Lens array contains one micro-lens 139 for each optic fiber 34 in bundle 16 and preferably, the axis of each micro-lens 139 is aligned with the axis of the corresponding optic fiber 34. For each optic fiber 34, lens 26 and the corresponding micro-lenses 139 together provide a two-element compound lens assembly to focus the refracted light signal 20 from switch 24 into the particular optic fiber 34. The diameter of each micro-lens 139 may be approximately equal to the diameter of the corresponding optic fiber 34, including the cladding of the optic fiber 34. This embodiment allows using the optic fiber array 34 containing standard single-mode 0.125-mm fibers and reduces the insertion losses of system 10.

Figure 6:
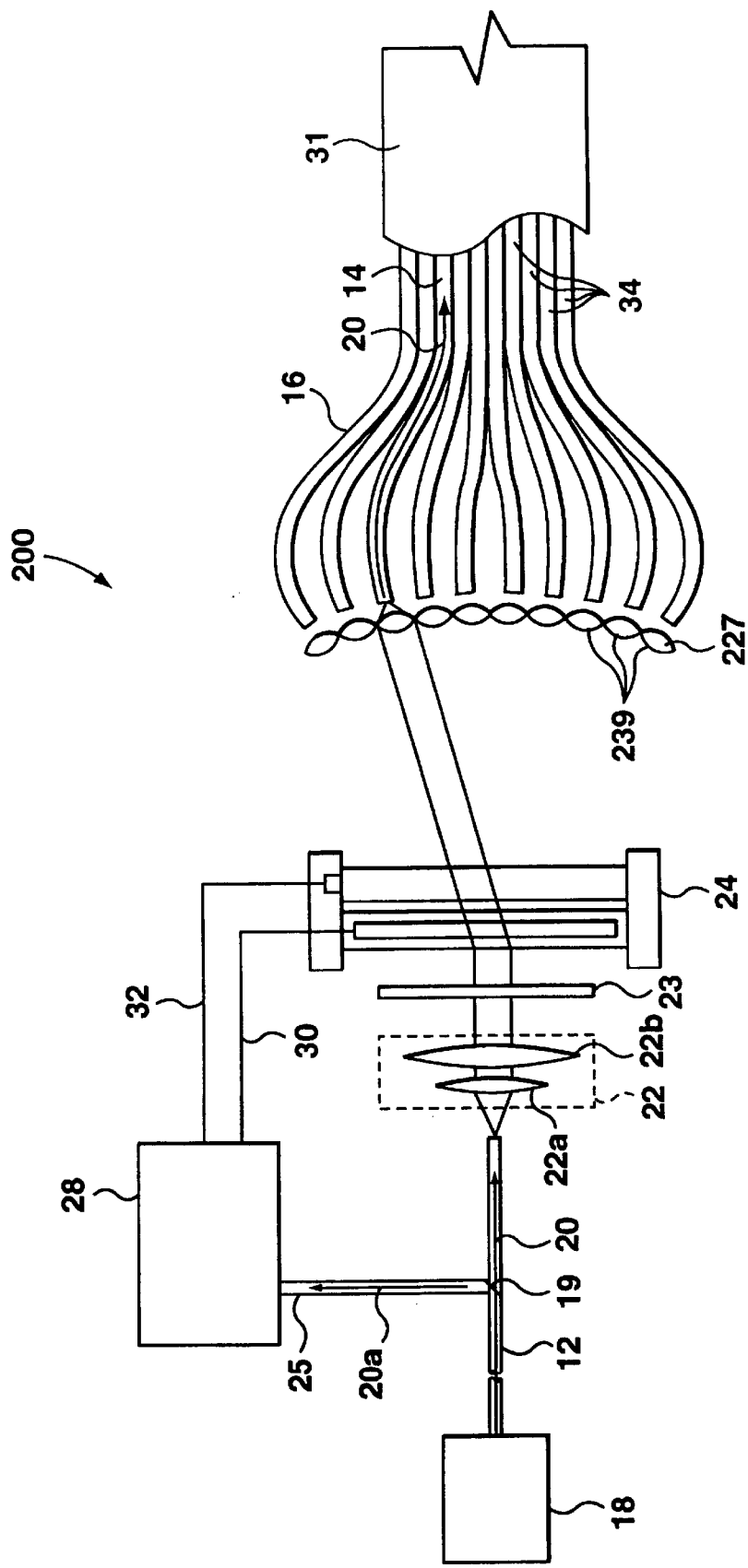
FIG. 6 is a schematic view of a system according to a third embodiment of the present invention.

Reference is next made to FIG. 6, which illustrates a system according to a third embodiment of the present invention. In this embodiment, lens 26 is replaced by a spherical, two-dimensional multi-lens array 227 (only one row of spherical lens array 227 is shown in FIG. 6). Lens array 227 contains one micro-lens 239 corresponding to each fiber 34 in bundle 16. The ends of fibers 34 are positioned co-axially with the corresponding micro-lens 239 and the axis of each pair of fiber 34 and micro-lens 239 is directed into the center of switch 24. In this embodiment, the ends of each optic fiber 34 lies on a focal surface of lens 39 from lens array 27 compensating for the curvature of the compound focal surface of compound lens array 227. This embodiment also allows optic fibers 34 to be standard single-mode 0.125-mm fibers and also reduces insertion losses of the optical signal.

Figure 7:
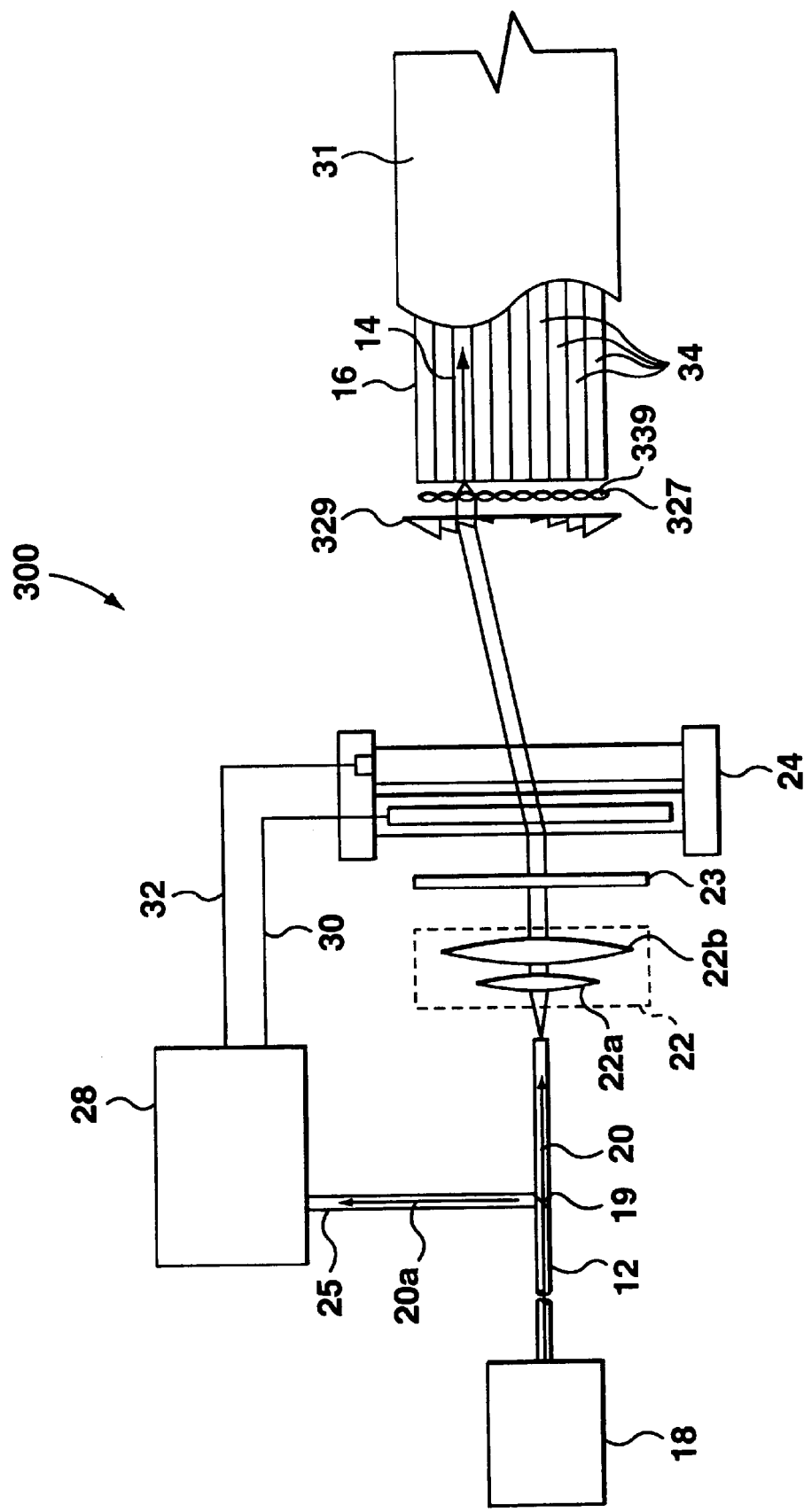
FIG. 7 is a schematic view of a system according to a fourth embodiment of the present invention.

Reference is next made to FIG. 7, which illustrates a system 300 according to a fifth embodiment of the present invention. In system 300, lens 26 has been replaced by an optical multi-wedge array 329 and planar multi-lens array 327. Multi-lens array 327 is similar in structure and operation to multi-lens array 127 of FIG. 5. A part of one optical wedge 330 is aligned with one micro-lens 339 from array 327. Each micro-lens 339 is aligned co-axially with one optic fiber 34 in bundle 16. This embodiment allows the use of two planar lens assemblies (329 and 327), while also reducing insertion losses. Multi-wedge lens 329 is more efficient than lens 26 of system 10 (FIG. 1). Planar lens array 327 is less costly to manufacture than the spherical lens array 227 of system 200 (FIG. 6).

The present invention may be used without generating standing acoustic waves in crystals 40, 42. If, in a different embodiment (not shown) of a switch according to the present invention, sides 56, 60 of crystals 40, 42 are not mirrored, then acoustic waves 52, 54 will simply be running waves in crystals 40, 42. This has the disadvantage that only about 60–65% of light incident on each crystal 40, 42 of the alternative embodiment is transmitted in the first order diffracted signal. The total efficiency of the switch 24 will be only about 40% in this case. This embodiment has the advantage that the switching time is reduced to about 5 $\mu$s, since it is not necessary for a standing wave to be established. For greater certainty, running waves may also be referred to as travelling waves.

In another embodiment (not shown) of a switch according to present invention additional piezo-electric crystal may be coupled to sides 58, 62 of crystals 40, 42. Controller 28 may be coupled to the additional piezo-electric crystals. Control signal 48, 50 may be used to activate the additional piezo-electric crystals so that two similar acoustic waves are generated in each crystal 40, 42. The two waves in each crystal will travel towards each other, producing a standing acoustic wave in half the time required when a single piezo-electric crystal is used in conjunction with a mirrored opposing surface. This embodiment will have the switching time of approximately 5 $\mu$s.

In another embodiment (not shown) of the present invention, switch 24 may be configured with only one crystal 40 and the associated piezo-electric crystal 44 and control line 30. This embodiment may be used when it is necessary to couple an input optical fiber with one of a series of output optical fibers arranged in a linear array. This embodiment will have the same switching time of 10 $\mu$s as described above.

In another embodiment (not shown), lens 26 (FIG. 1) may be omitted entirely and lens assembly 22 may be relied on to focus optical signal 20 into a particular optic fiber 34 in array 16. Such an embodiment may be suitable for a low cost system where there are only a few optic fibers 34 in bundle 16.

The invention has been described here by way of example only. Many variations may be made without departing form the spirit and scope of the invention, which is limited only by the following claims.

We claim:

1. An optical switching apparatus for coupling a first optic fiber with a second optic fiber, said switch comprising:

(a) a controller for producing a first electric signal and a second electric signal;
   (b) first and second optically active elements, each of said optically active elements having a diffraction angle;
   (c) first and second piezoelectric transducers coupled to said controller for receiving said first and second electric signals, said first piezoelectric transducer being coupled to said first optically active element and being responsive to said first electric signal to produce a first acoustic wave in said first optically active element, said second piezoelectric transducer being coupled to said second optically active element and being responsive to said second electric signal to produce a second acoustic wave in said second optically active element, wherein the diffraction angle of said first optically active element corresponds to said first acoustic wave, and wherein the diffraction angle of said second optically active element corresponds to said second acoustic wave, and wherein an optical signal emitted from said first optic fiber is deflected by said first and second optically active elements into said second optic fiber.

2. The apparatus of claim 1 further comprising a second lens assembly positioned between said first and second optically active elements and said second optic fiber for directing said optical signal into said second optic fiber.

3. The apparatus of claim 2 further comprising an array of branch fibers, wherein said second fiber is one of said branch fibers.

4. The apparatus of claim 3 wherein said second lens assembly includes a two-dimensional array of micro-lenses, wherein each of said micro-lenses corresponds to one of said branch fibers.

5. The apparatus of claim 4 wherein said second lens assembly further comprises a multi-wedge array.

6. The apparatus of claim 5 wherein said multi-wedge array is positioned between said first and second optically active elements and said two-dimensional array of micro-lenses.

7. The switch of claim 6 wherein an optical axis of each said branch fibers is aligned co-axially with an axis of the corresponding micro-lens.

8. The apparatus of claim 5 wherein said multi-wedge array is planar.

9. The apparatus of claim 4 wherein each of said micro-lenses has a diameter approximately equal to an outer diameter of a corresponding branch fiber.

10. The apparatus of claim 4 wherein each of said micro-lenses has diameter equal to a distance between two adjacent branch fibers.

11. The apparatus of claim 4 wherein said two-dimensional array of micro-lenses is planar.

12. The apparatus of claim 4 wherein said second lens assembly further comprises a second lens.

13. The apparatus of claim 3 wherein each of said micro-lenses is co-axially aligned with a corresponding branch fiber.

14. The apparatus of claim 13 wherein an end of each of said branch fibers is positioned at the focal plane of the corresponding micro-lens.

15. The switch of claim 3 wherein each of said branch fibers has an optical axis, each of optical axes of said branch fibers being positioned parallel to an optical axis of said focusing lens.

16. The apparatus of claim 3 wherein said second lens assembly includes a spherical two-dimensional array of micro-lenses, wherein each of said micro-lenses corresponds to one of said branch fibers.

17. The apparatus of claim 2 wherein said second lens assembly is a focusing lens.

18. The apparatus of claim 1 further comprising an array of branch fibers, wherein said second fiber is one of said branch fibers.

19. The apparatus of claim 18 wherein said array of branch fibers is mounted in a frame.

20. The apparatus of claim 19 wherein said frame has three-dimensional actuators to precisely adjust the position said array of branch fibres.

21. The apparatus of claim 18 wherein said array of branch fibers is a regular rectangular array having parallel rows and columns.

22. The apparatus of claim 18 wherein said array of branch fibers is a regular hexagonal array wherein the centers of branch fibers in successive rows are offset by a distance approximately equal to the radius of said branch fibers.

23. The apparatus of claim 18 wherein said branch fibers are arranged randomly in said array of branch fibers.

24. The apparatus of claim 1 wherein:
(d) said first piezoelectric transducer is coupled to one side of said first optically active element such that said first acoustic wave travels in a first direction;
(e) a third piezoelectric transducer is coupled to a second side of said first optically active element, said second side of first optically active element being opposed to said one side of said first optically active element, wherein said third piezoelectric transducer is coupled to said controller for receiving a third electric signal, such that said third piezoelectric transducer induces a third acoustic wave in said first optically active element, and wherein said first and third acoustic waves travel in opposite directions, thereby creating a standing acoustic wave in said first optically active element.

25. The apparatus of claim 24 wherein said third electric signal corresponds to said first electric signal.

26. The apparatus of claim 24 wherein
(f) said second piezoelectric transducer is coupled to one side of said second optically active element such that said second acoustic wave travels in a second direction;
(g) a fourth piezoelectric transducer is coupled to a second side of said second optically active element, said second side of second optically active element being opposed to said one side of said second optically active element, wherein said fourth piezoelectric transducer is coupled to said controller for receiving a fourth electric signal, such that said fourth piezoelectric transducer induces a fourth acoustic wave in said second optically active element, and wherein said second and fourth acoustic waves travel in opposite directions, thereby creating a standing acoustic wave in said second optically active element.

27. The apparatus of claim 24 wherein said third electric signal corresponds to said first electric signal and wherein said fourth electric signal corresponds to said second electric signal.

28. The apparatus of claim 1 further comprising a lens assembly coupled to said first optic fiber for directing said optical signal emitted from said first optic fiber onto said first optically active element in a narrowly diverging beam, wherein the said optical signal emitted from said first optic fiber is incident on said first optically active element at an acute angle.

29. The apparatus of claim 28 wherein said lens assembly includes one objective lens.

30. The apparatus of claim 28 wherein said lens assembly includes two or more objective lens elements.

31. The apparatus of claim 28 wherein said acute angle is greater than 87°.

32. The apparatus of claim 1 further including a buffer for buffering selected portions of said optical signal.

33. The apparatus of claim 32 wherein said buffer is an optical delay element.

34. The apparatus of claim 32 wherein said buffer is an electronic data storage device.

35. The apparatus of claim 1 further comprising a splitter coupled to said first optic fiber for providing a control optical signal, wherein said splitter is coupled to a control optical fiber, and wherein said control optical fiber is coupled to said controller for transmitting said control optical signal from said splitter to said controller.

36. The apparatus of claim 35 wherein said controller is responsive to said control optical signal to control the diffraction angles of said first and second optically active elements.

37. The apparatus of claim 1 further comprising a polarization rotating element for adjusting the angle of polarization of said optical signal emitted from said first optical fiber.

38. The apparatus of claim 37 further comprising a polarizer positioning device for rotating said polarization rotating element in response to a polarizer control signal from said controller.

39. The apparatus of claim 1 wherein:
(a) said first piezoelectric transducer is coupled to one side of said first optically active element and a first reflective element is coupled to an opposing side of said first optically active element such that said first acoustic wave travels in a first direction, is reflected by said reflective element and then travels in a third direction, wherein said third direction is substantially opposite to said first direction, thereby creating a standing acoustic wave in said first optically active element; and
(b) said second piezoelectric transducer is coupled to one side of said second optically active element and a second reflective element is coupled to an opposing side of said second optically active element such that said second acoustic wave travels in a second direction, is reflected by said reflective element and then travels in a fourth direction, wherein said fourth direction is substantially opposite to said second direction, thereby creating a standing acoustic wave in said second optically active element.

40. The apparatus of claim 39 wherein said first direction and said third directions are generally at right angles to one another.

41. The apparatus of claim 1 wherein said first optically active element is a first tellurium dioxide crystal and said second optically active elements is a second tellurium dioxide crystal.

42. The apparatus of claim 1 further comprising a mounting frame for holding said first and second crystals parallel to one another.

43. The apparatus of claim 1 wherein the diffraction angles of said first and second optically active elements are generally perpendicular to one another.

44. The apparatus of claim 1 wherein said controller includes an input for monitoring said input signal.

45. The apparatus of claim 1 wherein:
(a) said first piezoelectric transducer is coupled to one side of said first optically active element and a first acoustic absorbing element is coupled to an opposite side of said first optically active element such that said first acoustic wave travels through said first optically active element one time and is absorbed by said first acoustic absorbing element, and (b) said second piezoelectric transducer is coupled to one side of said second optically active element and a second acoustic absorbing element is coupled to an opposite side of said second optically active element such that said second acoustic wave travels through said second optically active element one time and is absorbed by said second acoustic element.

46. The use of the device of claim 1 in a time division multiplexing optical communication system.

47. An optical switch for coupling a first optic fiber with a second optic fiber, said switch comprising:

(a) a controller for producing an electric signal;

(b) a piezoelectric transducer for receiving said electric signal and providing an acoustic signal corresponding to said electric signal;

(c) an optically active element responsive to said acoustic signal for controlling the diffraction angle of said optically active element, wherein said controller generates a signal to control the diffraction angle of said optically active element such that an optical signal emitted from said first fiber passes through said optically active element and is deflected into said second optic fiber.

48. The switch of claim 47 wherein said piezoelectric transducer is coupled to a first side of said optically active element and a reflective element is coupled to an opposing side of said optically active element, wherein said acoustic signal passes through said optically active element in one direction and is reflected through said optically active element in an opposing direction to produce a standing acoustic wave.

49. The switch of claim 47 wherein said piezoelectric transducer is coupled to one side of said optically active element and an acoustic absorbing element is coupled to an opposite side of said optically active element such that said acoustic wave travels in one direction and is absorbed by said absorbing elements.

50. The switch of claim 47 wherein said piezoelectric transducer is coupled to one side of said optically active element and an opposite piezoelectric transducer is coupled to an opposite side of said optically active element such that said acoustic wave travels in one direction and an opposite acoustic wave travels in opposite direction, thereby creating a standing acoustic wave in said optically active element.

51. A method for directing an optical signal emitted from a first optic fiber into a second optic fiber, said method comprising the steps of:

(a) selecting said second optic fiber from a plurality of optic fibers;

(b) deflecting said optical signal along a first plane;

(c) deflecting said optical signal along a second plane generally perpendicular to said first plane; and (d) focusing said optical signal such that it is aligned with said second fiber.

52. The method of claim 51 wherein said second fiber is one a plurality of branch fibers, and wherein the following step is performed before step (a):

(f) store in a controller predetermined coordinates of each of said branch fibers.

53. The method of claim 52 wherein the following step is performed before step (a):

(g) iteratively determining the coordinates of each said branch fiber by first determining the position of one or more test fibers associated with said branch fibers, wherein said test fibers are held in fixed relation to said branch fibers.

54. The method of claim 53 wherein the step of determining the position of said one or more test fibers is performed by:

(i) selecting one of said test fibers;

(ii) transmitting a signal and adjusting the position of said branch fibers until said signal is received in said selected test fiber; and (iii) repeating steps (i) and (ii) zero or more times.

55. The method of claim 51 wherein the following step is performed before step (a):

(e) reducing the divergence of said optical signal.

56. The method of claim 51 wherein the following step is performed before step (b):

(h) adjusting an angle of polarization of said optical signal.

* * * * *

UNITED STATES PATENT AND TRADEMARK OFFICE
CERTIFICATE OF CORRECTION

PATENT NO.    : 6,539,132 B2
DATED         : March 25, 2003
INVENTOR(S)   : Gennadii Ivtsenkov et al.

It is certified that error appears in the above-identified patent and that said Letters Patent is hereby corrected as shown below:

Column 11,
Line 61, delete "wherein the said optical", insert therefor -- wherein said optical --

Signed and Sealed this

Twelfth Day of August, 2003

JAMES E. ROGAN
*Director of the United States Patent and Trademark Office*